(12) United States Patent
Liljeblad et al.

(10) Patent No.: US 11,649,821 B2
(45) Date of Patent: May 16, 2023

(54) POWER GENERATING UNIT

(71) Applicants: Volvo Truck Corporation, Gothenburg (SE); Parker Hannifin Manufacturing Sweden AB, Trollhättan (SE)

(72) Inventors: Benny Liljeblad, Lerum (SE); Stefan Johansson, Nödinge (SE); Lars R. Nilsson, Uddevalla (SE)

(73) Assignees: Volvo Truck Corporation, Gothenburg (SE); Parker Hannifin Manufacturing Sweden AB, Trollhättan (SE)

( * ) Notice: Subject to any disclaimer, the term of this patent is extended or adjusted under 35 U.S.C. 154(b) by 362 days.

(21) Appl. No.: 16/606,356

(22) PCT Filed: Apr. 24, 2017

(86) PCT No.: PCT/SE2017/050404
§ 371 (c)(1),
(2) Date: Oct. 18, 2019

(87) PCT Pub. No.: WO2018/199818
PCT Pub. Date: Nov. 1, 2018

(65) Prior Publication Data
US 2021/0293228 A1    Sep. 23, 2021

(51) Int. Cl.
*F04B 53/22* (2006.01)
*F04D 29/60* (2006.01)
(Continued)

(52) U.S. Cl.
CPC .......... *F04B 53/22* (2013.01); *F04D 29/605* (2013.01); *F04B 17/05* (2013.01); *F04D 13/021* (2013.01)

(58) Field of Classification Search
CPC ........ F04B 13/021; F04B 17/03; F04B 17/05; F04B 29/605; F04B 53/22
See application file for complete search history.

(56) References Cited

U.S. PATENT DOCUMENTS 2,997,958 A * 8/1961 Heinicke ............... F04D 29/126
415/214.1
3,491,696 A * 1/1970 Howard ............. F04D 29/2238
415/143
(Continued)

FOREIGN PATENT DOCUMENTS

CN    101312845 A    11/2008
CN    101392746 A    3/2009
(Continued)

OTHER PUBLICATIONS

Surface Technology Inc., Composite Diamond Coating, Sep. 5, 2016 (Year: 2016).*

(Continued)

*Primary Examiner* — Alexander B Comley
(74) *Attorney, Agent, or Firm* — Withrow & Terranova, PLLC

(57) ABSTRACT

A power generating unit including a hydraulic unit; an interface unit connected to the hydraulic unit, the interface unit being connectable to a stationary unit; a power flow shaft connected between the hydraulic unit and the interface unit for supply of a torque load therebetween; and at least one connecting element arranged between the hydraulic unit and the interface unit, the at least one connecting element being controllable between a first state in which a relative rotation between the hydraulic unit and the interface unit is allowed, and a second state in which a relative rotation between the hydraulic unit and the interface unit is prevented.

8 Claims, 6 Drawing Sheets

(51) Int. Cl.
*F04B 17/05* (2006.01)
*F04D 13/02* (2006.01)

(56) References Cited

U.S. PATENT DOCUMENTS

| | | | |
|---|---|---|---|
| 6,764,284 | B2 | 7/2004 | Oehman, Jr. |
| 6,854,956 | B2 | 2/2005 | Miwata et al. |
| 9,260,010 | B2 | 2/2016 | Neumann |
| 9,926,961 | B1 * | 3/2018 | Engelen .................. F16B 17/00 |
| 2003/0129068 | A1 * | 7/2003 | Oehman, Jr. ........... F04B 53/16 |
| | | | 417/360 |

FOREIGN PATENT DOCUMENTS

| | | | | |
|---|---|---|---|---|
| CN | 103080557 | A | 5/2013 | |
| DE | 10149388 | A1 * | 12/2002 | .......... F04C 15/0073 |
| DE | 10149388 | A1 | 12/2002 | |
| DE | 102012211104 | A1 | 1/2014 | |
| DE | 102013224912 | A1 | 6/2015 | |
| EP | 2031250 | A1 | 3/2009 | |
| WO | 2007058594 | A1 | 5/2007 | |
| WO | 2012030783 | A2 | 3/2012 | |

OTHER PUBLICATIONS

First Office Action for Chinese Patent Application No. 201780089905. 2, dated Feb. 26, 2021, 11 pages.
Extended European Search Report for European Patent Application No. 17907323.4, dated Jul. 29, 2020, 11 pages.
Author Unknown, "Turbine Housing Clamp and Bolt Kit," Product Specification, ATP Turbo, 2014, Advanced Tuning Products, Inc., 1 page.
International Search Report and Written Opinion for International Patent Application No. PCT/SE2017/050404, dated Jan. 25, 2018, 12 pages.
International Preliminary Report on Patentability for International Patent Application No. PCT/SE2017/050404, dated Mar. 14, 2019, 6 pages.

* cited by examiner

POWER GENERATING UNIT

This application is a 35 USC 371 national phase filing of International Application No. PCT/SE2017/050404, filed Apr. 24, 2017, the disclosure of which is incorporated herein by reference in its entirety.

TECHNICAL FIELD

The present invention relates to a power generating unit. The invention is applicable on vehicles, in particularly low, medium and heavy duty vehicles commonly referred to as trucks.

BACKGROUND

Power generating units are commonly used in various applications, such as e.g. applications within the field of vehicles. The power generating unit is arranged to handle a load in a rotational manner and power from this unit can be transferred mechanically via a power flow shaft, or hydraulically by e.g. fitting a hydraulic unit to the power generating unit. The hydraulic unit may, for example, be a hydraulic pump, whereby the power generating unit is connected to a source of rotational energy of the vehicle for being able to propel the pump.

A power generating unit comprising such hydraulic pump is described in WO 2007/058594. As described herein, the power generating unit is mountable to a casing of an internal combustion engine. The power generating unit comprises a housing provided with a flange connecting the power generating unit to the combustion engine. The flange further comprises a plurality of bolt holes which are aligned with corresponding bolt holes of the casing. The power generating unit is thus fixated to the combustion engine by means of bolt joints arranged in the bolt holes of the flange and the casing.

Although the power generating unit described in WO 2007/058594 is able to sufficiently supply hydraulic pressure and flow to a driven accessory, it is still in need of further improvements in terms of e.g. flexibility in connecting the power generating unit to the combustion engine or other stationary units.

SUMMARY

It is an object of the present invention to provide a power generating unit which at least partially overcomes the above described deficiencies. This is achieved by a power generating unit according to claim 1.

According to a first aspect of the present invention, there is provided a power generating unit comprising a hydraulic unit; an interface unit connected to the hydraulic unit, the interface unit being connectable to a stationary unit; a power flow shaft connected between the hydraulic unit and the interface unit for supply of a torque load there between; and at least one connecting element arranged between the hydraulic unit and the interface unit, the at least one connecting element being controllable between a first state in which a relative rotation between the hydraulic unit and the interface unit is allowed, and a second state in which a relative rotation between the hydraulic unit and the interface unit is prevented.

The wording "stationary unit" should in the present context be referred to as a unit which may comprise a driven unit or a driving unit. Hence, the stationary unit may comprise means which is propelled by the hydraulic unit, or means which is arranged to propel the hydraulic unit. Thus, the hydraulic unit may be a hydraulic fluid pump which is propelled by a source of rotational energy of the stationary unit, such as e.g. an engine transmission or a gearbox transmission, etc. The hydraulic unit may also be a hydraulic motor which is propelling an arrangement of the stationary unit, such as e.g. a compressor, a generator, other hydraulic units, etc.

Furthermore, it should be readily understood that the interface unit is exposed to a torque load when the power flow shaft supplies a torque load between the interface unit and the hydraulic unit. Hence, the power flow shaft is connected to the hydraulic unit, thus exposing the housing thereof to torque loads. The power flow shaft is hence a mechanical shaft arranged to transfer torque loads.

An advantage is that the hydraulic unit and the interface unit can be connected to each other at substantially any rotational position there between by using the at least one connecting element. Hence, an increased degree of freedom in comparison to e.g. bolt connections between the hydraulic unit and the interface unit is achieved. A bolt connection requires bolt holes of the hydraulic unit and the interface unit to be aligned, while the connecting element, such as a friction element as will be described below, can connect the hydraulic unit to the interface unit at substantially any desirable position as seen in the rotational direction thereof. The interface unit can be connected to the stationary unit by conventional connecting means, such as e.g. bolt connections, screw connections, etc. As substantially any rotational position between the hydraulic unit and the interface unit is achievable, easier access to the bolt connections is provided.

Furthermore, by being able to position the hydraulic unit to the interface unit at substantially any rotational position there between, a simplified connection of other components in the vicinity thereof is provided. This may be especially beneficial for a vehicle application where the available space underneath the cabin is limited. Assembling of the hydraulic unit can be also be simplified as fewer components are provided in comparison to the prior art, whereby less assembling steps may be required.

According to an example embodiment, the at least one connecting element may at least partially overlap a first surface of the hydraulic unit and a first surface of the interface unit.

Hereby, the connecting element is preferably arranged as a friction element, whereby the friction between the at least one connecting element and the first surface of the hydraulic unit and the interface unit is sufficient to withstand the above described torque loads.

According to an example embodiment, the connecting element may be arranged to provide a pressure against the first surface of the hydraulic unit and the first surface of the interface unit when being positioned in the second state, the pressure being higher than a predetermined threshold limit.

According to an example embodiment, the first surface of the hydraulic unit and the first surface of the interface unit may be arranged substantially parallel to each other.

According to an example embodiment, the interface unit may be positioned radially outside the hydraulic unit such that the interface unit at least partially encloses the hydraulic unit. Hereby, the interface unit and the hydraulic unit can be rotated relative to each other by rotating the hydraulic unit inside the interface unit. The first surface of the hydraulic unit may preferably have a surface normal in the same direction as the surface normal of the first surface of the interface unit. The surface normal of the first surface of the hydraulic unit and the first surface of the interface unit may preferably be directed away from the stationary unit. Also, the surface normal of the first surface of the hydraulic unit and the first surface of the interface unit may preferably be arranged in the axial direction of the power flow shaft.

According to an example embodiment, the connecting element may comprise a connecting surface facing the hydraulic unit and the interface unit, the connecting surface comprises a material composition having a friction coefficient high enough to withstand the torque loads. The friction coefficient is preferably higher than 0.5.

According to an example embodiment, the connecting surface may comprise a coating of electroless nickel matrix embedded with diamond particles.

According to an example embodiment, the interface unit may comprise means for connection to the stationary unit. As described above, the means may be a bolt connection, a screw connection, etc.

According to an example embodiment, the connecting element may comprise a plurality of through-holes aligned with the means for connecting the power generating unit to the stationary unit. Hereby, the connecting element may provide a sufficient compression force against the hydraulic unit and the interface unit, while at the same time connecting the power generating unit to the stationary unit.

According to an example embodiment, the connecting element may be a circumferentially arranged connecting element positioned radially outside the first surface of the hydraulic unit and the first surface of the interface unit. Such connecting element may be arranged as a v-shaped connecting element.

According to an example embodiment, the connecting element may be arranged in abutment with the first surface of the hydraulic unit and the first surface of the interface unit for providing a compression force between a second surface of the hydraulic unit and a second surface of the interface unit when the connecting element is positioned in the second state.

Hereby, the surface normal of the first surface of the hydraulic unit and the first surface of the interface unit may preferably have a component in the radial direction facing the connecting element. The surface normal of the second surface of the hydraulic unit may preferably face the surface normal of the second surface of the interface unit.

According to an example embodiment, the connecting element may comprise a protruding portion and the hydraulic unit may comprise an indentation, wherein the protruding portion of the connecting element is aligned with the indentation of the hydraulic unit. Hereby, the protruding portion and the indentation provides for additional prevention of mutual rotation between the hydraulic unit and the interface unit.

According to an example embodiment, the connecting element may be a washer element bolted to the interface unit and arranged in abutment with the interface unit and the hydraulic unit.

According to an example embodiment, the hydraulic unit may comprise a pump housing and a fluid pump for supply of pressurized fluid flow to at least one driven accessory. The at least one driven accessory is thus preferably positioned on an opposite side of the power generating unit in comparison to the stationary unit.

According to an example embodiment, the stationary unit may be a housing for a source of rotational energy, wherein the power flow shaft is connectable to the source of rotational energy.

According to an example embodiment, the fluid pump may comprise a pump shaft, the pump shaft being connectable to the power flow shaft by means of a clutch unit. Hereby, the power flow shaft can be controllably connected to the pump shaft.

Further features of, and advantages with, the present invention will become apparent when studying the appended claims and the following description. The skilled person will realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein:

FIG. 2b is a perspective view of the assembled power generating unit in FIG. 2a;

FIG. 3b is a perspective view of a cross-section of the power generating unit depicted in FIG. 3a.

DETAILED DESCRIPTION OF EXAMPLE EMBODIMENTS OF THE INVENTION

Figure 1:
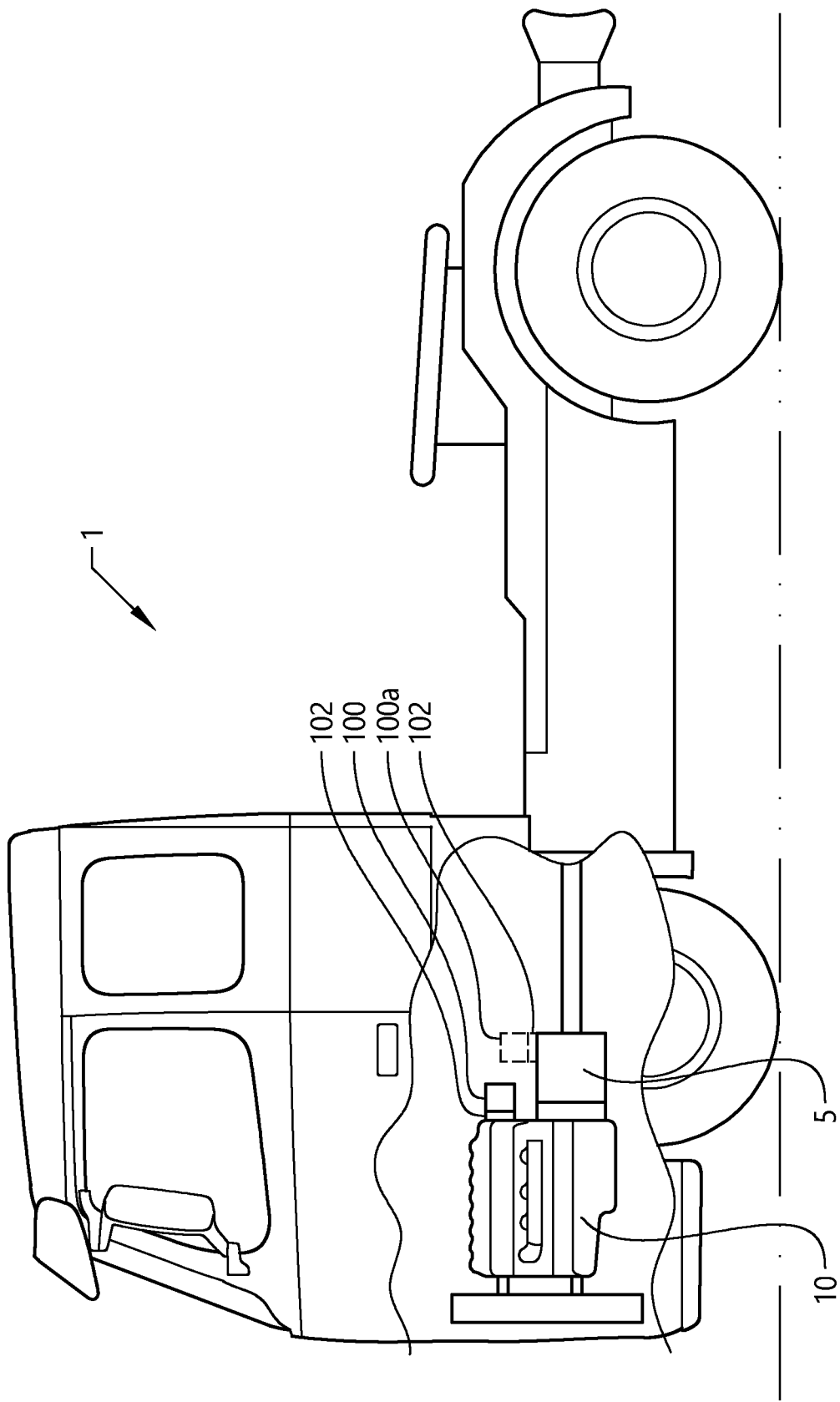
FIG. 1 is a side view of a vehicle in the form of a truck comprising a power generating unit according to an example embodiment.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is depicted a vehicle 1 in the form of a truck for which the power generating unit 100 which will be described below is particularly suitable for. The power generating unit 100 may however be provided and used in other applications as well, such as e.g. agricultural machines, fans, lifting cranes, engines used in process industries, etc. For simplicity, the following will however only describe the power generating unit 100 in relation to a truck. As depicted in FIG. 1, the vehicle comprises a prime mover 10, here in the form an internal combustion engine 10, a transmission arrangement 5, and power generating unit 100, 100a. The power generating unit 100 is in FIG. 1 connected to the engine transmission of the internal combustion engine via an interface unit 102. However, and as depicted in dashed lines, the power generating unit 100a may instead of, or in additional be connected to the transmission arrangement 5.

With reference to the power generating unit 100, FIGS. 2a-4 will in the following describe various alternative embodiments. As can be seen from the figures, FIGS. 3b and FIG. 4 illustrate the power flow shaft and bearings etc. connected to the power generating unit. It should thus be readily understood that these aspects, i.e. the interior of the power generating unit 100 is equally applicable for the embodiment depicted in FIGS. 2a-2b.

Figure 2A:
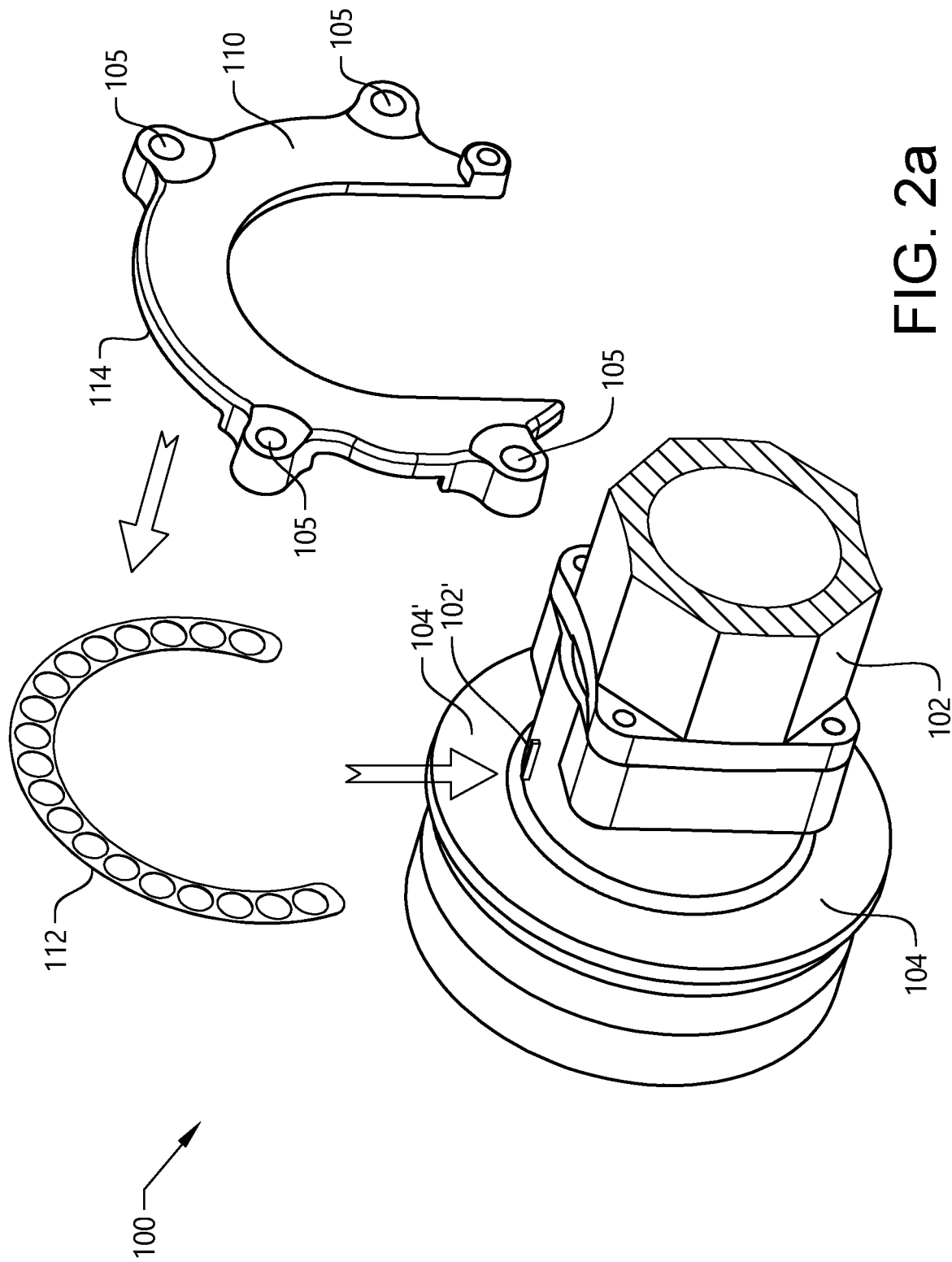
FIG. 2a is an exploded perspective view of a power generating unit according to an example embodiment.
Figure 2B:
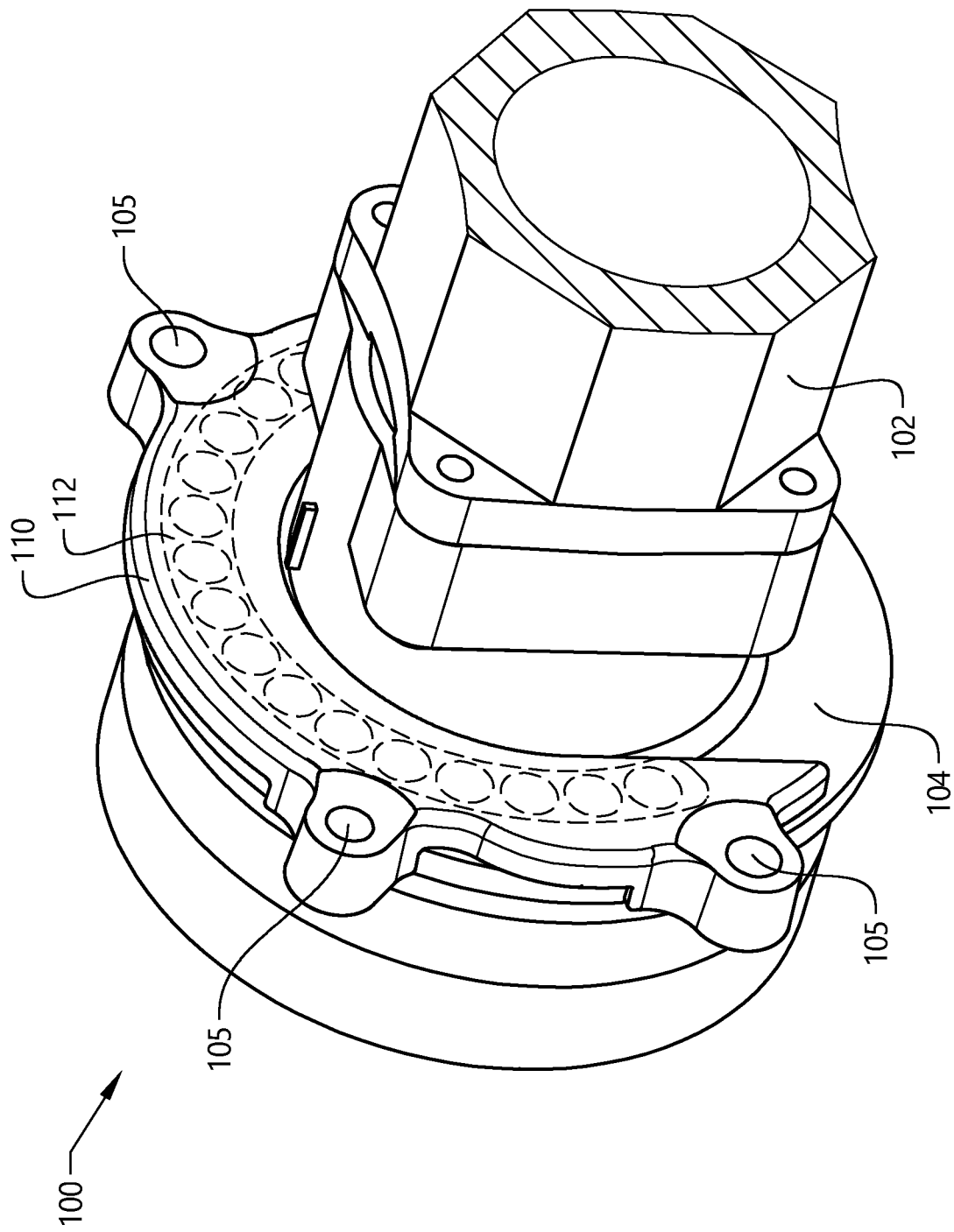

Now, reference is made to FIGS. 2a-2b in order to describe the power generating unit 100 according to an example embodiment. FIG. 2a is an exploded view illustrating components of the power generating unit 100, while FIG. 2b illustrates the power generating unit 100 in an assembled configuration. As can be seen, the power generating unit 100 comprises a hydraulic unit 102. The hydraulic unit 102 may be a hydraulic pump or a hydraulic motor. Moreover, the power generating unit 100 further comprises an interface unit 104 connected to the hydraulic unit 102 and arranged to be connected to a stationary unit, such as e.g. the engine transmission of the internal combustion engine 10, or a housing of the engine transmission as described above in relation to the description of FIG. 1. The power generating unit 100 also comprises a connecting element 110 arranged between the hydraulic unit 102 and the interface unit 104. The connecting element 110 is arranged to attach the hydraulic unit 102 to the interface unit 104. This is accomplished by arranging the connecting element 110 such that it overlaps a first surface 102' of the hydraulic unit 102 and a first surface 104' of the interface unit 104, while at the same time fixating the connecting element 110 to the stationary unit by means of e.g. bolt connections through the bolt holes 105 of the connecting element 110. Hereby, the connecting element 110 prevents the hydraulic unit 102 from rotating relative to the interface unit 104 when the power flow shaft (see e.g. 302 in FIG. 3b) supplies a torque load between the hydraulic unit 102 and the interface unit 104.

Furthermore, the connecting element 110 comprises a friction element 112 positioned between a contact surface 114 of the connecting element 110 and the hydraulic unit 102 and the interface unit 104. The friction element 112 may be arranged as an external component or be integrated in the connecting element 110. The friction element 112 may comprise a coating of electroless nickel matrix embedded with diamond particles. Hereby, a proper friction coefficient between the elements in contact with each other is obtained. Such friction coefficient is preferably higher than 0.5.

By means of the power generating unit 100 depicted in FIGS. 2a-2b, the hydraulic unit 102 can be rotated approximately 360 degrees relative the interface unit 104 in a first state when the connecting element 110 is disconnected from, or not fully connected to the stationary unit. In a second state, in which the connecting element 110 is fixated to the stationary unit, the hydraulic unit 102 is prevented from rotating relative the interface unit 104.

Figure 3A:
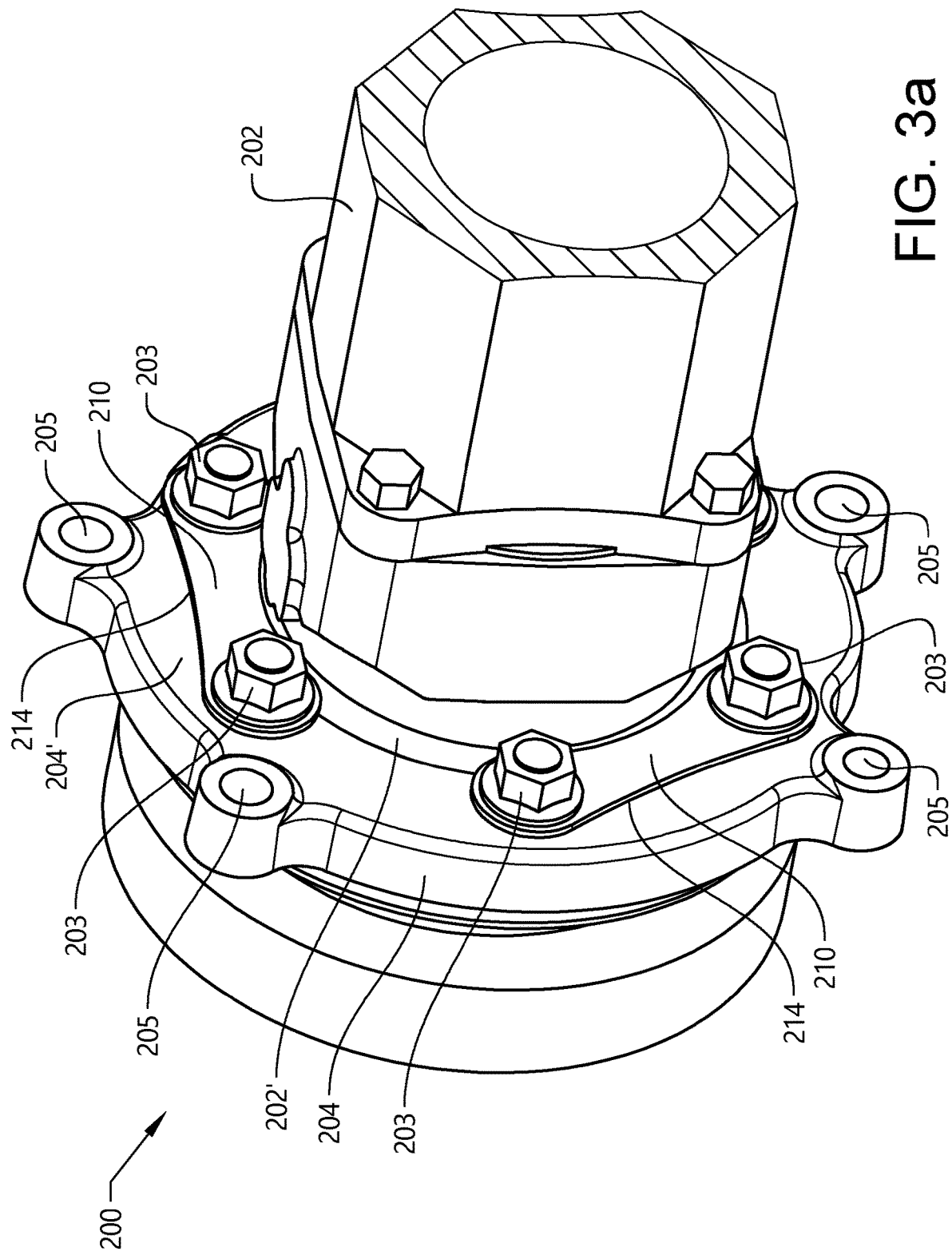
FIG. 3a is a perspective view of a power generating unit according to another example embodiment.
Figure 3B:
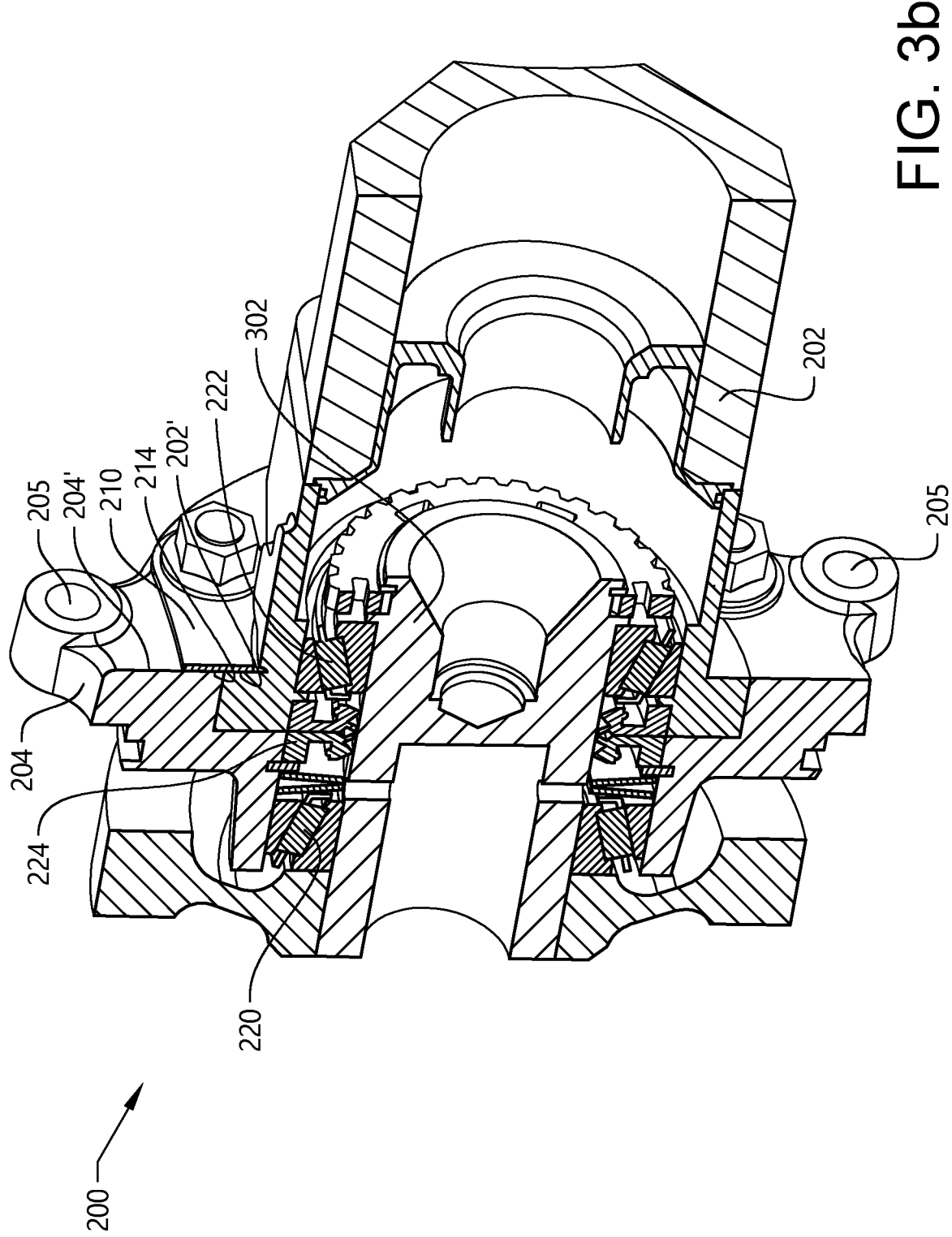
Figure 4:
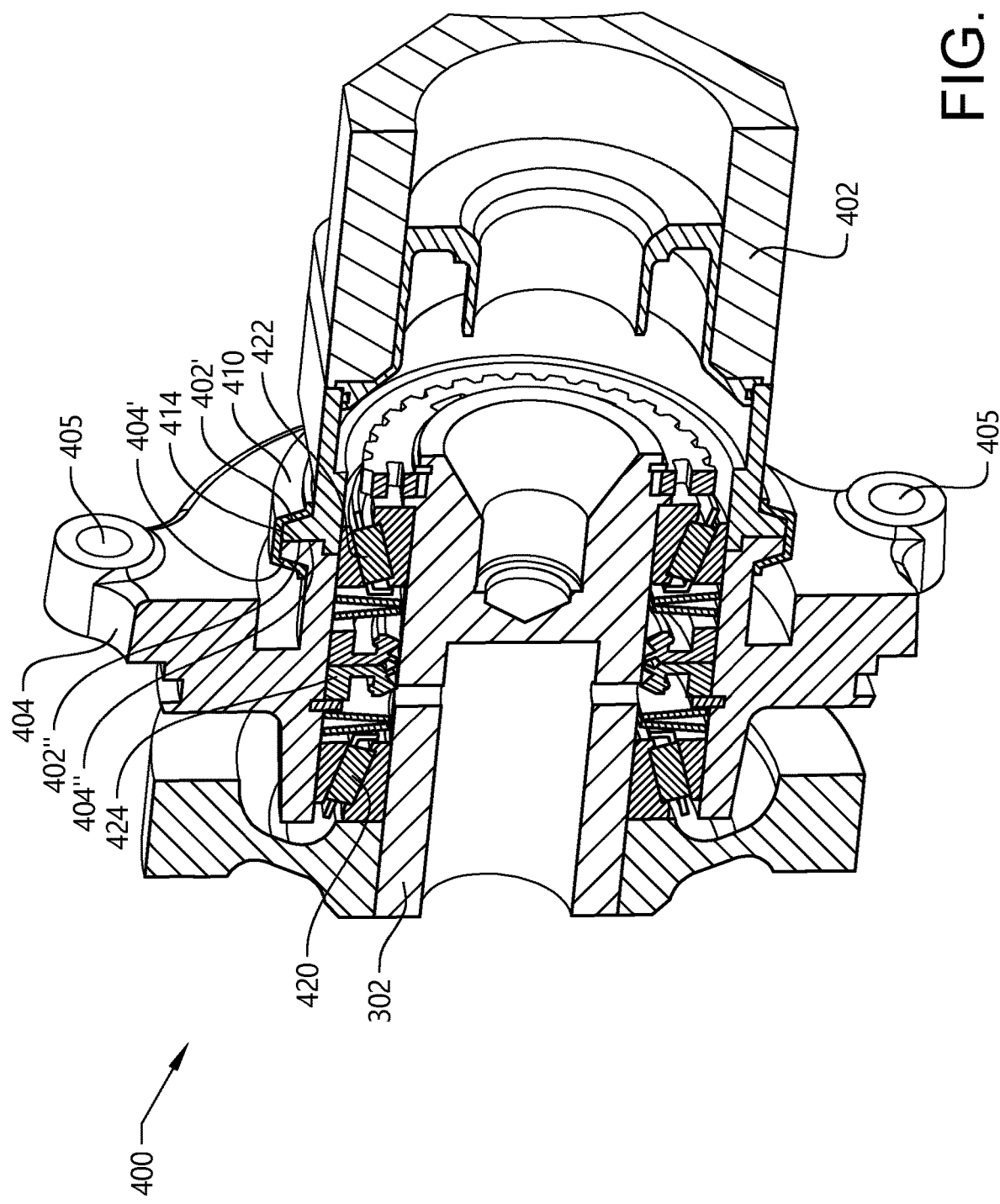
FIG. 4 is a perspective view of a cross-section of a power generating unit according to another example embodiment.

Reference is now made to FIGS. 3a-3b illustrating the power generating unit 200 according to another example embodiment. With particular reference to FIG. 3a, a plurality of connecting elements 210 and an interface unit 204 is depicted according to another example embodiment. As can be seen, the power generating unit 200 comprises a plurality of connecting elements 210 in the form of washer elements. Each of these connecting elements 210 is bolted to the interface unit 204 by means of a pair of bolts 203. Hereby, a contact surface 214 of the connecting elements 210 overlaps a first surface 202' of the hydraulic unit 202 and a first surface 204' of the interface unit 204, thus preventing a relative rotation between hydraulic unit 202 and the interface unit 204.

Moreover, the interface unit 204 comprises a plurality of bolt holes 205 for fixating the interface unit 204 to the stationary unit. The interface unit 204 is thus in the embodiment depicted in FIGS. 3a-3b bolted to the stationary unit by means of bolt connections through the bolt holes 205.

As described above, the contact surface 214 of the connecting elements 210 overlaps the first surface 202' of the hydraulic unit 202 and the first surface 204' of the interface unit 204. The hydraulic unit 202 is thus connected to the interface unit 204 by means of the friction and compression force from the connecting elements 210. Each of the connecting elements 210 can therefore preferably comprises the above described friction element 112 positioned between the contact surface 214 of the respective connecting element 210 and the hydraulic unit 202 and the interface unit 204. Similarly to the above description, the friction element 112 may be arranged as an external component or be integrated in each of the respective connecting elements 210. The friction element 112 may comprise a coating of electroless nickel matrix embedded with diamond particles. Hereby, a proper friction coefficient between the elements in contact with each other is obtained. Such friction coefficient is preferably higher than 0.5.

With reference to FIG. 3b, a perspective view illustrating a cross-section of the power generating unit 202 in FIG. 3a is depicted. As can be seen in FIG. 3b, and as described above in relation to FIG. 3a, the contact surface 214 of the connecting elements 210 overlap each of the first surface 202' of the hydraulic unit 202 and the first surface 204' of the interface unit 204. Hence, the contact surface 214 of the connecting elements 210 are arranged in abutment with each of the first surface 202' of the hydraulic unit 202 and the first surface 204' of the interface unit 204.

According to the example embodiment depicted in FIG. 3b, the interface unit 204 is at least partially positioned radially outside the hydraulic unit 202, i.e. the hydraulic unit 202 is at least partially enclosed by the interface unit 204.

As can also be seen in FIG. 3b, a power flow shaft 302 is arranged between the interface unit 204 and the hydraulic unit 202. According to an example embodiment, the power flow shaft 302 is connected to the engine transmission described above, wherein the engine transmission is connected to the power flow shaft 302 at an opposite side of the interface unit 204 in comparison to the hydraulic unit 302. In such case, the power flow shaft may be connected to a hydraulic pump of the hydraulic unit 202 for supply of pressurized fluid flow to e.g. a driven accessory of the vehicle 1. According to another example, the power flow shaft 302 may be connected to a compressor or other propelled accessory, as well as to a hydraulic motor of the hydraulic unit 202 for propulsion of the compressor.

The power flow shaft 302 is preferably connected to the interface unit 204 by means of an interface bearing arrangement 220 and to the hydraulic unit 202 by means of a hydraulic unit bearing arrangement 222. The bearing arrangements are preferably arranged as tapered roller bearings, although other alternatives are conceivable. Also, sealing elements 224 are arranged between the bearing arrangements 220, 222.

Once the power generating unit 200 is connected to the stationary unit, in the following also referred to as the engine transmission, the power flow shaft 302 can be driven by the engine transmission to drive a hydraulic pump of the hydraulic unit 202. The operation of the hydraulic pump may be controlled by engaging or disengaging a clutch unit (not shown) positioned between the power flow shaft 302 and a pump shaft (not shown) of the hydraulic pump. By means of the clutch unit, the hydraulic pump is only operated when hydraulic pressure and flow is required by one or more driven accessories.

Furthermore, when the torque load is supplied by the power flow shaft 302, the interface between the interface unit 204 and the hydraulic unit 202 is exposed to a torque load, whereby a relative rotation between the interface unit 204 and the hydraulic unit 202 is prevented by means of the above described connecting elements 210.

By means of the power generating unit 200 depicted in FIGS. 3a-3b, the hydraulic unit 202 can be rotated approximately 360 degrees relative the interface unit 204 in a first state when the connecting elements 210 are disconnected from, or not fully connected to the interface unit 204. In a second state, in which the connecting elements 210 are fixated to the interface unit 204, the hydraulic unit 202 is prevented from rotating relative the interface unit 204.

With reference to FIG. 4, a perspective view illustrating a cross-section of the power generating unit 400 according to another example embodiment is depicted. The main difference between the power generating unit 400 depicted in FIG. 4 and the power generating unit 100, 200 depicted in FIGS. 2a-3b lies in the connecting element 422 between the hydraulic unit 402 and the interface unit 404.

As can be seen in FIG. 4, the connecting element 410 is arranged in the form of a v-shaped connecting element, such as a v-clamp, provided with tightening means (not shown) for fixating the hydraulic unit 402 to the interface unit 404. The connecting element 410 is thus a circumferentially arranged connecting element positioned radially outside the first surface 402' of the hydraulic unit 402 and the first surface 404' of the interface unit 404. Hereby, a radially inwardly facing contact surface 414 of the connecting element 410 is arranged in abutment with the first surface 402' of the hydraulic unit 402 and the first surface 404' of the interface unit 404.

The hydraulic unit 402 and the interface unit 404 are positioned axially next to each other, whereby a second surface 402" of the hydraulic unit 402 and a second surface 404" of the interface unit 404 are arranged in abutment with each other. The second surfaces 402", 404" of the hydraulic unit 402 and the interface unit 404 thus each have a surface normal in the axial direction of the power generating unit 400. Hereby, a compression force between the second surface 402" of the hydraulic unit 402 and the second surface 404" of the interface unit 404 is provided when tightening the v-clamp.

As also depicted in FIG. 4, the power generating unit 400 comprises a power flow shaft 302 in a similar manner as depicted for the embodiment in FIGS. 3a-3b. Hence, the power generating unit 400 in FIG. 4 is preferably connected to the interface unit 404 by means of an interface bearing arrangement 420 and to the hydraulic unit 402 by means of a hydraulic unit bearing arrangement 422. The bearing arrangements are preferably arranged as tapered roller bearings, although other alternatives are conceivable. Also, sealing elements 424 are arranged between the bearing arrangements 420, 422. As stated above, also the embodiment in FIGS. 2a-2b comprises the power flow shaft which is connected to the hydraulic unit 102 and the interface unit 104 in a similar manner as the above description.

By means of the power generating unit 400 depicted in FIG. 4, the hydraulic unit 402 can be rotated approximately 360 degrees relative the interface unit 404 in a first state when the connecting element 410 is disconnected from, or not fully connected to the interface unit 404 and the hydraulic unit 402. In a second state, in which the connecting element 410 is fixated to the interface unit 404 and the hydraulic unit 402, the hydraulic unit 402 and the interface unit 404 are prevented from rotating relative to each other.

It should also be readily understood that the connecting element 410 in FIG. 4 can comprise the above described friction element 112 positioned between the contact surface 414 of the connecting element 410 and the hydraulic unit 402 and the interface unit 404. Similarly to the above description, the friction element 112 may be arranged as an external component or be integrated in the connecting element 210. The friction element 112 may comprise a coating of electroless nickel matrix embedded with diamond particles. Hereby, a proper friction coefficient between the elements in contact with each other is obtained. Such friction coefficient is preferably higher than 0.5.

It is to be understood that the present invention is not limited to the embodiments described above and illustrated in the drawings; rather, the skilled person will recognize that many changes and modifications may be made within the scope of the appended claims.

The invention claimed is:

1. A power generating unit comprising:
   a hydraulic unit;
   an interface unit connected to the hydraulic unit, the interface unit being connectable to a stationary unit;
   a power flow shaft extending across a portion of the hydraulic unit and the interface unit, the power flow shaft being configured to expose an interface between the hydraulic unit and the interface unit to a torque load; and
   at least one connecting element at least partly overlapping a first surface of the hydraulic unit and a first surface of the interface unit in a radial direction of the power generating unit, wherein a direction of a vector normal to the first surface of the hydraulic unit is the same as a direction of a vector normal to the first surface of the interface unit, the at least one connecting element being controllable between a first state in which a relative rotation between the hydraulic unit and the interface unit is allowed, and a second state in which a connecting surface of the at least one connecting element is arranged in abutment with, and provides, in an axial direction of the power generating unit, a pressure against, the first surface of the hydraulic unit and the first surface of the interface unit to prevent a relative rotation between the hydraulic unit and the interface unit, the pressure being higher than a predetermined threshold limit.

2. The power generating unit of claim 1, wherein the interface unit is positioned radially outside the hydraulic unit such that the interface unit at least partially encloses the hydraulic unit.

3. The power generating unit of claim 1, wherein the connecting surface comprises a coating of electroless nickel matrix embedded with diamond particles.

4. The power generating unit of claim 1, wherein the interface unit comprises a connector configured to connect the power generating unit to the stationary unit.

5. The power generating unit of claim 4, wherein the at least one connecting element comprises a plurality of through-holes aligned with the connector configured to connect the power generating unit to the stationary unit.

6. The power generating unit of claim 1, wherein the at least one connecting element is an elongated plate element bolted to the interface unit and arranged in abutment with the interface unit and the hydraulic unit.

7. The power generating unit of claim 1, wherein the hydraulic unit comprises a pump housing and a fluid pump for supply of a pressurized fluid flow to at least one driven accessory.

8. The power generating unit of claim 7, wherein the stationary unit is a housing for a source of rotational energy, wherein the power flow shaft is connectable to the source of rotational energy.

* * * * *